United States Patent
Kumar et al.

(10) Patent No.: US 6,795,434 B1
(45) Date of Patent: Sep. 21, 2004

(54) REPLICATED SERVER DISCOVERY IN CLIENT-PROXY SERVERS

(75) Inventors: Harlharan Kumar, Portland, OR (US); Lakshman Krishnamurthy, Hillsboro, OR (US); Bernard N. Keany, Lake Oswego, OR (US); Sanjay Bakshi, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/195,344

(22) Filed: Nov. 18, 1998

(51) Int. Cl.[7] ............................................... H04L 12/28
(52) U.S. Cl. ...................................... 370/392; 709/203
(58) Field of Search ................................ 370/230, 233, 370/234, 235, 252, 389, 393, 471, 474, 392, 395.42; 709/203, 105, 219, 226

(56) References Cited

U.S. PATENT DOCUMENTS 6,175,869 B1 * 1/2001 Ahuja et al. ................ 709/226

* cited by examiner

*Primary Examiner*—Wellington Chin
*Assistant Examiner*—Brenda Pham
(74) *Attorney, Agent, or Firm*—Erik M. Metzger

(57) ABSTRACT

A replicated server discovery ("RSD") provides optimal or best-replicated servers to Web users without users' intervention. In one embodiment, the RSD is configured to receive server addresses using Domain Name System ("DNS") lookup, where the server addresses include replicated server addresses. The RSD further records responses from servers addressed by the server addresses and then sorts the server addresses according to the responses and data types involved in transactions.

34 Claims, 9 Drawing Sheets

REPLICATED SERVER DISCOVERY IN CLIENT-PROXY SERVERS

BACKGROUND OF THE INVENTION

1. Field of the Invention

The present invention relates generally to the field of communication system. More specifically, the present invention relates to a method of selecting a server from a computer network.

2. Description of the Related Art

With the Internet and the World Wide Web ("the Web") becoming a viable communication medium, demand in private interconnections between users and backbone providers has been rapidly increasing. In order to improve accessibility, duplication of popular websites across the Internet is often used to reduce access loading from main sites. Duplicated websites are generally referred to as replicated servers of main sites and they essentially contain the same information as the main sites. The replicated servers contain equivalent information and maintain the same internal state of user information. Accordingly, using the replicated servers improves user throughput and localization (e.g., by providing instant language translation between servers).

FIG. 1A illustrates a conventional configuration 100 between a main site 102 and replicated servers 104 and 110. The configuration 100 contains a main site 102 located in Santa Clara, Calif., for example, which has a universal resource locator ("URL") of www.placeholder.com, a first user in New York, a second user in Orlando 108, a replicated server A 104, and a replicated server B 110. Replicated server A 104 and B 110 contain the same information as the Santa Clara site 102 and the function of replicated server A 104 and B 110 is to reduce the Internet accessing load from the Santa Clara site 102. For example, the first user in New York 106 may access the replicated server A 104 instead of Santa Clara site 102 because the replicated server A 104 is physically located closer to the first user 106.

Similarly, the second user in Orlando 108 may access the replicated server B 110 since the replicated server B 110 is located closer to the second user 108. One advantage of having replicated servers physically located closer to users is to reduce travel distance between data and its destination. However, a near-by server is often not the optimal server for a requested transaction. To identify an optimal server, multiple factors such as the physical distance between servers and users, loading status of servers, bandwidth of server, and type of data should be considered. Moreover, the loading status of each server may dynamically change as each server accepts new accessing requests.

Another commonly encountered problem is that a network user may be required to select a server from of a list of available servers, which includes a main site and replicated servers, to implement the user's request. Selection of a best-server for the requested transfer not only adds additional steps, but also requires each user to have adequate knowledge of the server status.

One method that is commonly used for locating a proper server is using Domain Name Service (DNS) round robin, where a name server hands out a mirrored (or replicated) server address in round robin fashion. The conventional DNS round robin implementation is essentially a rudimentary distribution scheme that does not consider distance between users and servers, server requested loading status, and types of data.

Another method that is commonly used for locating a server is using server farms. This method typically uses a router and an array manager for balancing Web traffic loads amongst available servers. server farms requires additional hardware and a sophisticated router to implement. One problem with server farms is the classic routing problem, where the router is the bottleneck of the distribution process.

Yet another method that is also commonly used for locating a server is a "routing anycast" system. In the routing anycast system, multiple servers on the network have the same address. Thus, network routing protocols select the closest server in the network just as they would have a single address and a single server pair.

Accordingly, it is desirable to have a mechanism that allows Web users to locate optimal servers for their requests. As will be seen, one embodiment of the present invention provides a mechanism that allows an optimal server to be allocated without user's intervention.

SUMMARY OF THE INVENTION

A replicated server discovery ("RSD") method and apparatus provides optimal or best-replicated server access to Web users without users' intervention. In one embodiment, the RSD is configured to receive server addresses using Domain Name Server ("DNS") lookup, where the server addresses include replicated server addresses. The RSD further records responses from servers addressed by the server addresses and then sorts the server addresses according to the responses and types of data involved in transactions.

In one embodiment, the RSD is implemented by a proxy server. In another embodiment, RSD can also be implemented by a browser.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION

A method and an apparatus for identifying an optimal server among multiple mirrored servers including replicated servers without users' intervention is disclosed. In the following description of an embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

The replicated server discovery ("RSD") method and apparatus of the present invention provides a mechanism that allows Web and file transfer protocol ("FTP") users to access the Internet using optimal servers or sites. Websites are generally composed of servers or clusters of servers and consequently, the words "server" and "site" are synonymous in the following description. In one embodiment, RSD identifies an optimal site according to responses from data transactions and data types involved in transactions.

An optimal site is referred to as a Website that is capable of giving the fastest response to a user's request. Response time from server is one element used to determine an optimal server, where response time is measured between the time of initiating an access request to the server and the time of receiving a response to the request from the server. Types of data or data types to be transferred is another element used to determine an optimal server, where data types includes a large text, an audio, or video file. Different data type to be transferred across the network may require different network bandwidth for efficient transferring, (i.e., a video file normally requires a wider bandwidth to be transferred efficiently).

In operation, RSD does not employ additional hardware. Implementation of RSD, such as switching between servers, is seamless to users. Moreover, RSD is capable of storing new site addresses when new sites are created and deleting site addresses when sites are unavailable.

Figure 1A:
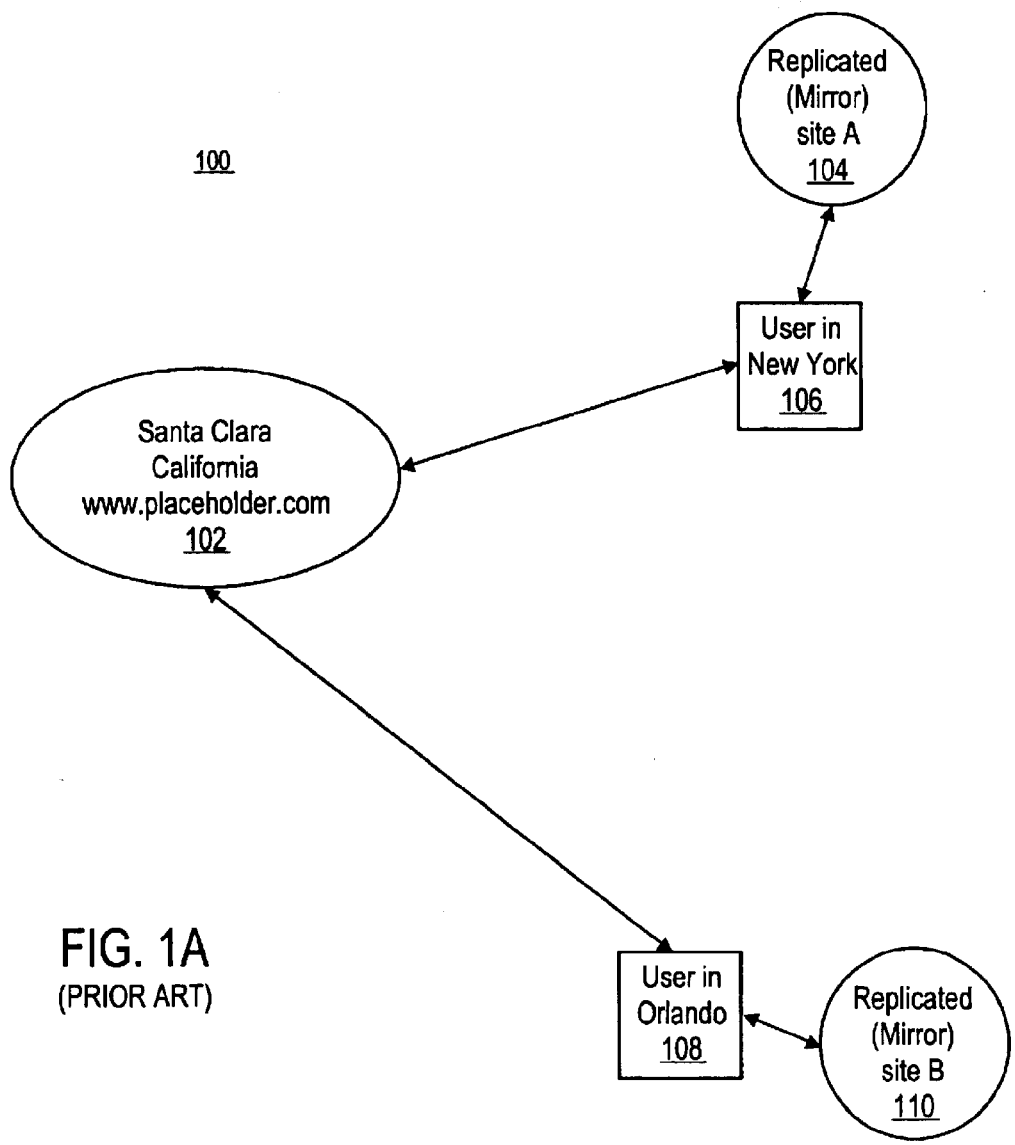
FIG. 1A illustrates a conventional interconnection between a main site and replicated servers.
Figure 1B:
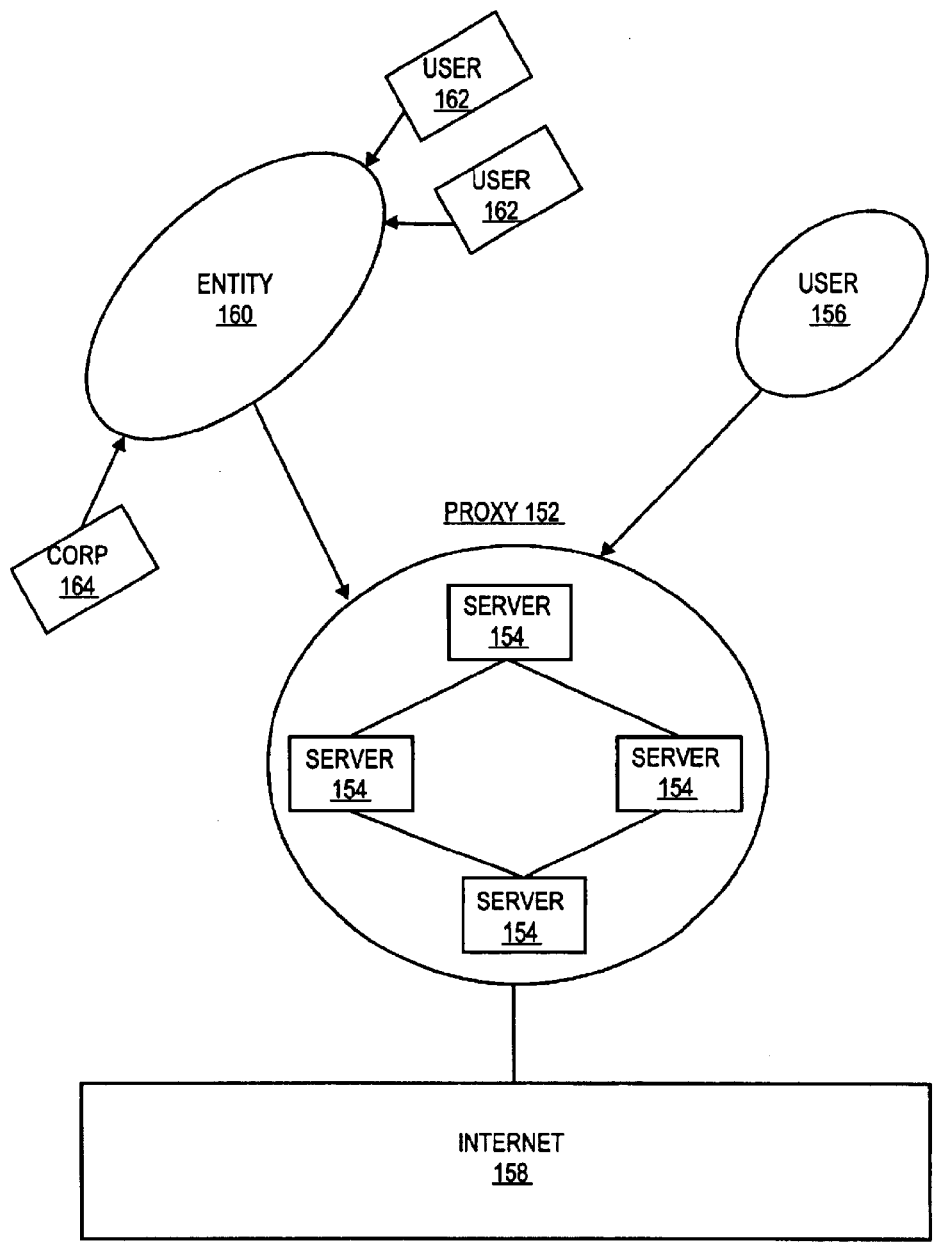
FIG. 1B illustrates a common configuration of an Internet connection containing a proxy.

In one embodiment, RSD is implemented by a proxy. FIG. 1B illustrates a common configuration of the Internet connection 150 containing a proxy 152. A proxy 152, which includes a server 154 or a cluster of servers 154, is used to connect between an entity 160 and the Internet 158. The entity 160 could be a single user 156, a corporation 164 or corporations, or other entity having many users 162. In operation, a proxy 152 containing RSD uses DNS protocol to initiate a DNS lookup for a universal resource locator ("URL") host name. DNS protocol currently supports a mechanism of providing all IP site addresses relating to replicated servers associated with one URL host name, and consequently, RSD may receive multiple IP server addresses including replicated servers.

Upon receiving the server addresses, RSD selects a server address and then uses the selected server address to perform the requested data transfer. RSD records the responses from the server and calculates the rate of transfer according to server response time and the types of data involved in the transfer. After all server addresses have been selected at least once for a network transfer, RSD sorts the server addresses where the sorting may depend on the rate of transfer and the types of data involved in transaction. After the sorting, the address listed on the top of the sorted list is the most preferred or the optimal server address and the address listed on the bottom of the sorted list is the least preferred server address for the transaction. Moreover, if the optimal server goes out of operation, the RSD automatically selects the next most preferred server on the sorted list as the new optimal server.

In another embodiment, RSD may be implemented by a DNS name server. In yet another embodiment, RSD can be implemented by an Internet Service Provider (ISP) where ISP can specify dial-up users to speed up access using replicated servers.

Figure 2:
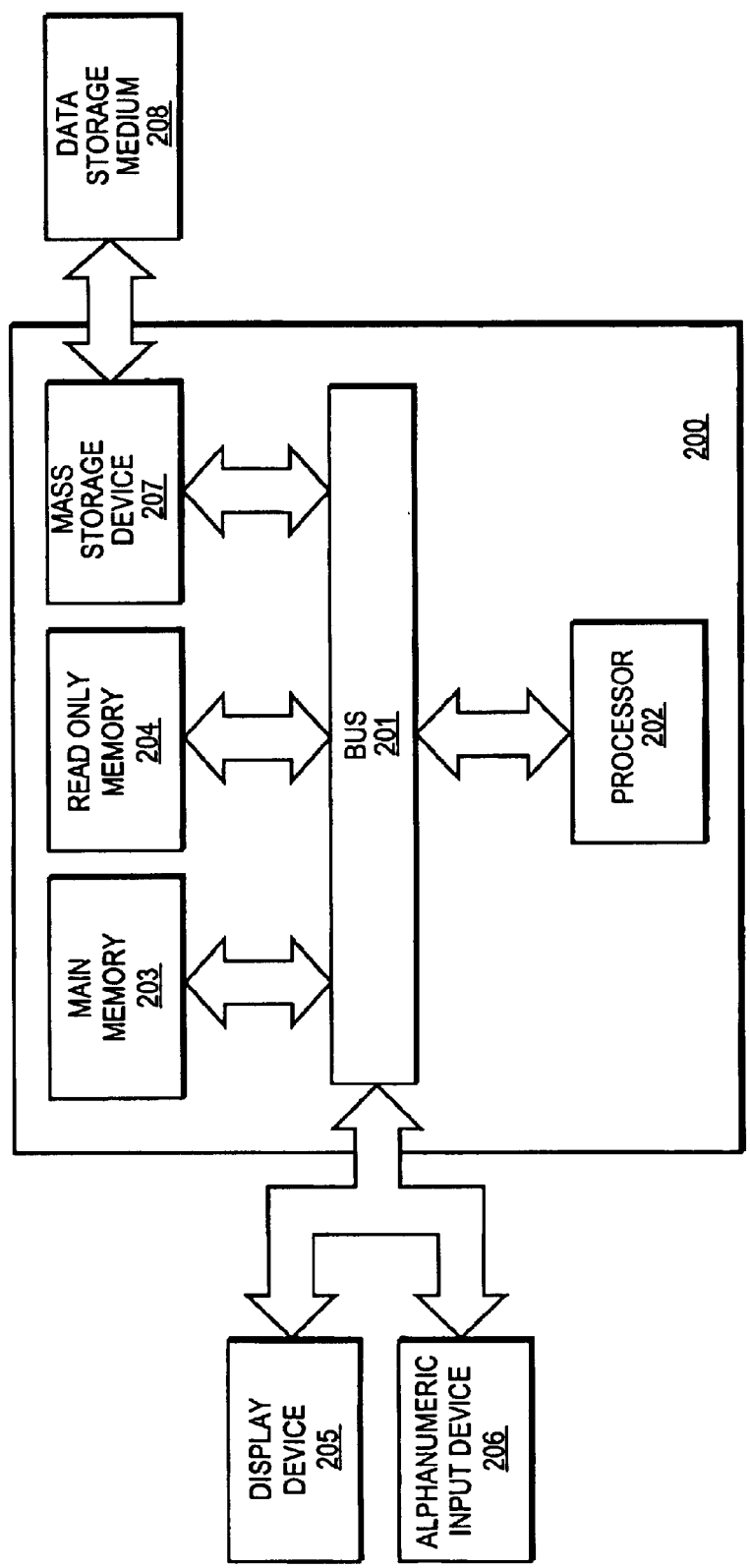
FIG. 2 illustrates a typical computer system on which the present invention may be utilized.

FIG. 2 illustrates a typical computer system 200 in which RSD operates. RSD can be implemented on any processor-based computer system or a system capable of implementing the Internet proxy, such as a personal computer ("PC"), a workstation, or a mainframe computer. It will be apparent to those of ordinary skill in the art that other alternative computer system architectures may also be employed.

In general, such computer systems as illustrated by FIG. 2 comprise a bus 201 for communicating information, a processor 202 coupled with the bus 201 for processing information, main memory 203 coupled with the bus 201 for storing information and instructions for the processor 202, a read-only memory 204 coupled with the bus 201 for storing static information and instructions for the processor 202, a display device 205 coupled with the bus 201 for displaying information for a computer user, an input device 206 coupled with the bus 201 for communicating information and command selections to the processor 202, and a mass storage device 207, such as a magnetic disk and associated disk drive, coupled with the bus 201 for storing information and instructions. A data storage medium 208 containing digital information is configured to operate with mass storage device 207 to allow processor 202 access to the digital information on data storage medium 208 via bus 201.

Processor 202 may be any of a wide variety of general purpose processors or microprocessors such as the Pentium™ microprocessor manufactured by Intel™ Corporation or the Motorola™ 68040 or Power PC™ brand microprocessor manufactured by Motorola™ Corporation. It will be apparent to those of ordinary skill in the art, however, that other varieties of processors may also be used in a particular computer system. Display device 205 may be a liquid crystal device, cathode ray tube (CRT), or other suitable display device. Mass storage device 207 may be a conventional hard disk drive, floppy disk drive, CD-ROM drive, or other magnetic or optical data storage device for reading and writing information stored on a hard disk, a floppy disk, a CD-ROM, a magnetic tape, or other magnetic or optical data storage medium. Data storage medium 208 may be a hard disk, a floppy disk, a CD-ROM, a magnetic tape, or other magnetic or optical data storage medium.

In general, processor 202 retrieves processing instructions and data from a data storage medium 208 using mass storage device 207 and downloads this information into random access memory 203 for execution. Processor 202 then executes an instruction stream from random access memory 203 or read-only memory 204. Command selections and information input at input device 206 are used to direct the flow of instructions executed by processor 202. Equivalent input device 206 may also be a pointing device such as a conventional mouse or trackball device. The results of this processing execution are then displayed on display device 205.

An embodiment of the present invention is implemented as a software module, which may be executed on a computer system such as computer system 200 in a conventional manner. Using well known techniques, the application software of the embodiment is stored on data storage medium 208 and subsequently loaded into and executed within computer system 200. Once initiated, the software of the embodiment operates in the manner described below.

Figure 3:
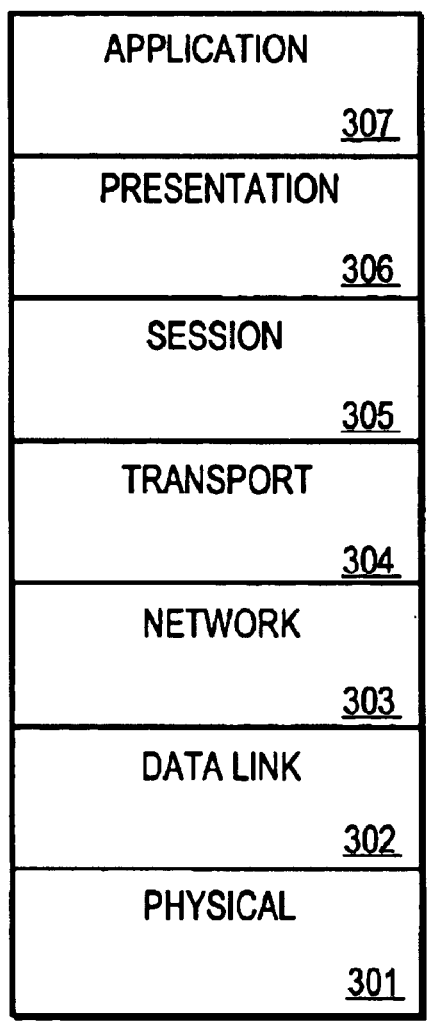
FIG. 3 illustrates the Open Systems Interconnection (OSI) model.

FIG. 3 illustrates the Open Systems Interconnection (OSI) reference model. OSI Model 300 is an international standard that provides a common basis for the coordination of standards development for the purpose of systems interconnection. The present invention is implemented to function as a routing switch within the "application layer" of the OSI model. The model defines seven layers, with each layer communicating with its peer layer in another node through the use of a protocol. Physical layer 301 is the lowest layer, with responsibility to transmit unstructured bits across a link. Data link layer 302 is the next layer above physical layer 301. Data link layer 302 transmits chunks across the link and deals with problems like checksumming to detect data corruption, orderly coordination of the use of shared media and addressing when multiple systems are reachable.

Network layer 303 enables any pair of systems in the network to communicate with each other. Transport layer 304 establishes a reliable communication stream between a pair of systems, dealing with errors such as lost packets, duplicate packets, packet reordering and fragmentation. Session layer 305 offers services above the simple communication stream provided by transport layer 304. Presentation layer 306 provides a means by which OSI compliant applications can agree on representations for data. Finally, application layer 307 includes services such as file transfer, access and management services (FTAM), electronic mail and virtual terminal (VT) services.

Figure 4:
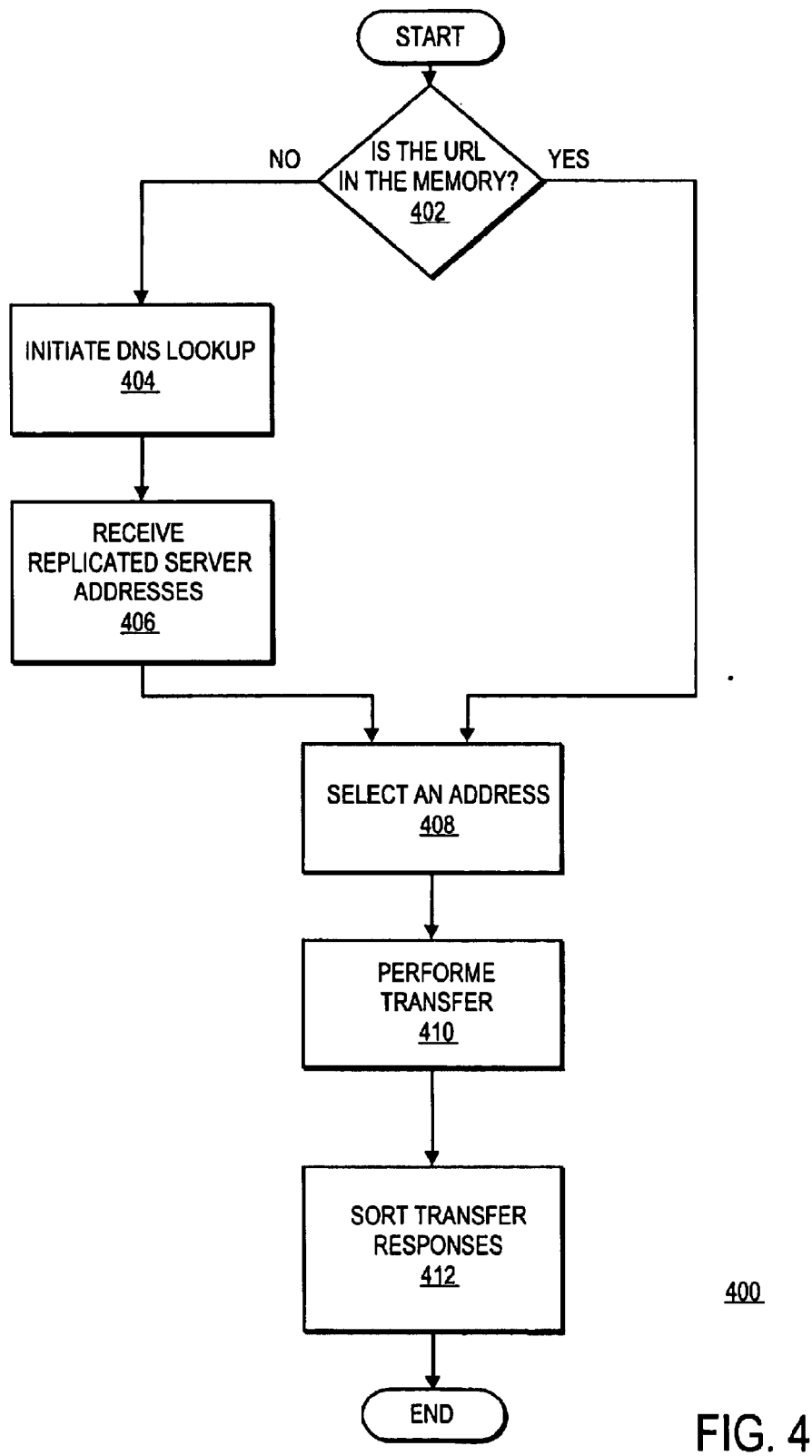
FIG. 4 illustrates Replicated Server Discovery ("RSD") in accordance with an embodiment of the present invention

FIG. 4 illustrates a flow chart of an embodiment of RSD 400. The process proceeds to block 402 to examine whether the requested URL host name is in the local cache memory. Cache memories are often deployed in network servers to enhance access response time by storing a set of last accessed Website IP (Internet Protocol) addresses. It should be noted that cache memory could be a separate hardware cache memory or a software defined cache memory data structure. If the requested URL host name is not in the cache, the process proceeds from block 402 to block 404, where the process initiates a DNS lookup for the requested URL host name. DNS is a distributed database for storing addresses of all Websites. Upon initiating a DNS lookup, DNS searches and collects addresses relating to the requested URL host name. After block 404, the process moves to block 406, where multiple server addresses may be received. The received server addresses include the main site address of URL host name, and addresses of replicated servers. The process stores the addresses and proceeds from block 406 to block 408, where a server address is selected.

On the other hand, referring to block 402, if the requested URL host name is found in the cache, the process proceeds directly from block 402 to block 408, where a server address is fetched from the cache. At block 408, the process determines that the selected server address is an optimal site address if all server addresses relating to the requested URL host name have been used for a transaction at least once. However, if at least one IP server address has not been used, RSD selects the next unused IP server address. After a server address has been selected at block 408, the process proceeds to block 410 where the process performs a requested transaction.

In another embodiment, the process determines the optimal IP server address by performing RSD Metrics on each IP server address before any transaction takes place. RSD Metrics is a combination of network tests, such as Ping, Traceroute, Opening a connection to port 80 and measuring response time, measuring the actual file transfer rate, and classifying transfer rate by file type. Ping is a common network testing method to determine response time. Traceroute is another common network testing method by making connection through hopping between addresses. Opening a connection to port 80 and measuring response time is yet another conventional network test and the test involves making a quick connection to measure the connection time. Moreover, measuring the actual rate of file transfer is also a commonly used network test that enables the determination of the transfer rate according to the size of a file transferred. Different file types can cause different rates of transfer and accordingly, RSD Metrics can be tailored to contain a combination of network testing tools in response to types of data.

After block 410, the process proceeds to block 412, where the process records responses from transactions and data types transferred. The process sorts the list of IP server addresses according to their rate of transfer and stores the sorted list in the cache. However, if all IP server addresses are used at least once, the address situated on the top of the sorted list is the most preferred site address and the address situated on the second from the top of the sorted list is the second most preferred site address and so on. Accordingly, the most preferred site address is the optimal IP site address. Moreover, the sorted list is updated regularly and also different optimal servers may be dedicated to different data types. After block 412, the process is terminated.

Figure 5:
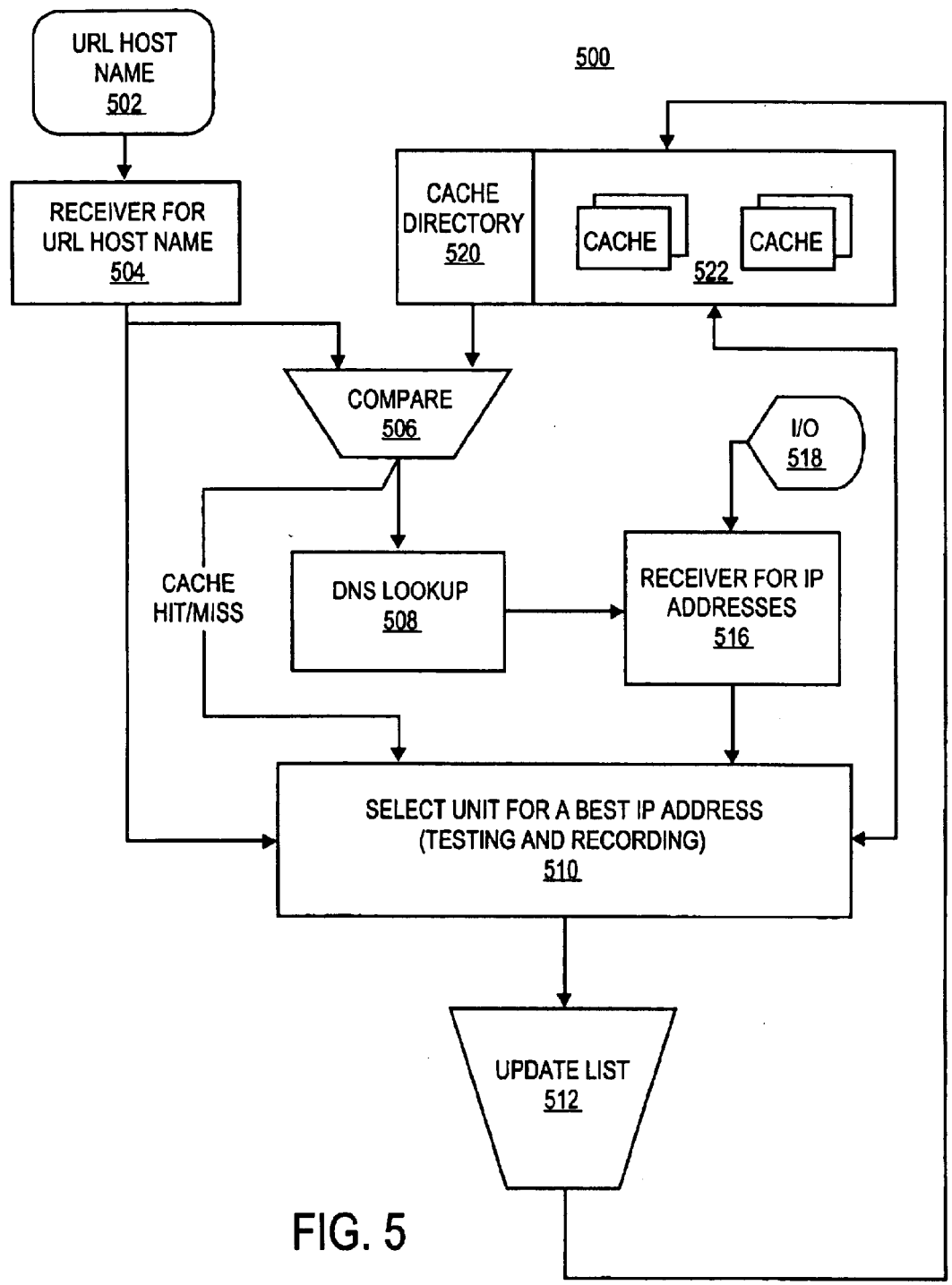
FIG. 5 illustrates a system process including RSD of the present invention in accordance with an embodiment of the present invention.

FIG. 5 illustrates a logical block diagram of RSD 500 in accordance with an embodiment of the present invention. The logical block diagram of RSD 500 shows a configuration of logical components used to implement RSD. RSD 500 includes a receiver for URL host name 504, a cache directory 520, a cache 522, a comparing unit 506, a DNS lookup unit 508, a receiver for IP addresses 516, a selecting unit 510, and an updating unit 512.

The receiver 504 is used to receive URL requests from Internet users and upon receiving a requested URL name host, the receiver 504 passes the URL to the comparing unit 506 and the selecting unit 510. The comparing unit 506 examines the cache directory 520 to determine whether the URL is already in the cache 522. If IP server addresses for the URL are in the cache 522, the comparing unit 506 issues a message of cache-hit to indicate that the IP server addresses are in the cache 522. However, if IP server addresses for the URL is not in the cache 522, the comparing unit 506 issues a message of cache-miss to indicate that IP server addresses are not in the cache 522. Both the message of cache-miss and the message of cache-hit, which could be configured to one message, are sent to the selecting unit 510 and DNS lookup unit 508.

Upon receiving the messages, DNS lookup unit 508 initiates a DNS lookup, where the search of IP server addresses related to the URL is activated. After receiving a list of IP server addresses via an I/O device 518, the receiver 516 passes the list to the selecting unit 510, where the selecting unit 510 performs the functions of storing, discarding, electing, and recording. If the message of cache-miss is sent, the selecting unit 510 discards the URL sent by the receiver 504 and receives a list of IP server addresses from the receiver 516, and subsequently stores the list in the cache. Upon receiving responses after performing the requested transaction, the selecting unit 510 records the responses including the rate of data transferred and data types involved in the transaction. In another embodiment, the selecting unit 510 identifies an optimal server address by performing RSD Metrics.

If the message of cache-hit is sent and there are no unused IP server addresses, the selecting unit 510 uses the URL sent by the receiver 504 as cache reference addresses to fetch the optimal server address from the cache 522. Unused IP server addresses are server addresses that have not been used to access Websites on the network. Accordingly, if there is at least one unused IP server address, the selecting unit 510 selects the next unused IP address for the transaction. Upon completion of the transaction, the selecting unit 510 records the responses from the transaction, such as rate of transfer and data types transferred, and subsequently passes the recorded information to the updating unit 512.

The updating unit 512 sorts the list of the IP server addresses according to the recorded responses and data types and stores the sorted list, which is also referred to as the preferred list of server addresses, in the cache 522 for future references. The address listed on the top of the sorted list is the optimal server address, which points to a server that is capable of giving the fastest response to a user's request. Once an optimal server address is discovered, the optimal server will be used for the subsequent Website access. In one embodiment, the list of preferred IP server addresses is updated every time a reference is made to the list. In another embodiment, RSD Metrics may be used to identify optimal server addresses.

Figure 6:
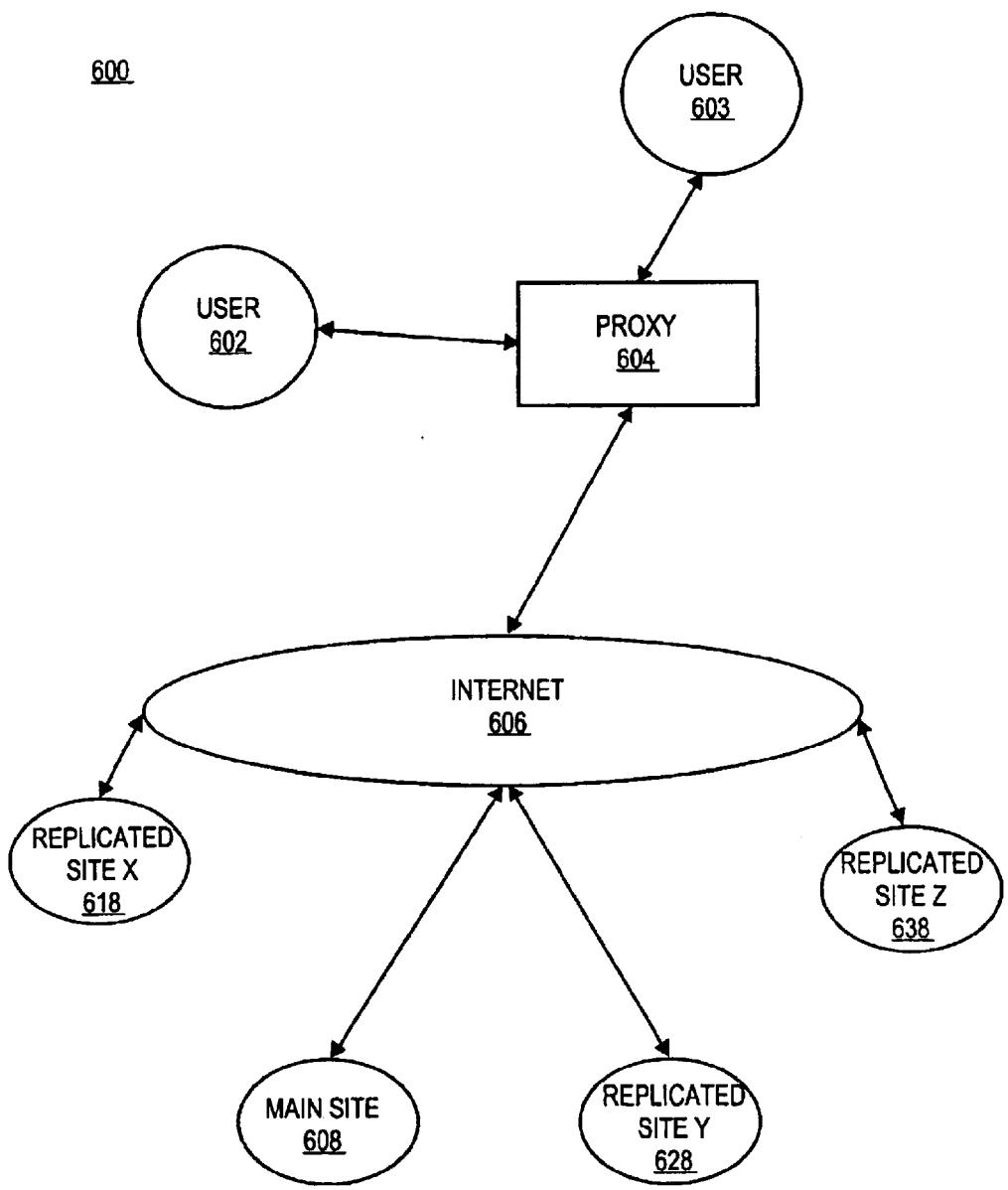
FIG. 6 illustrates a proxy server implementing RSD in accordance with an embodiment of the present invention.

FIG. 6 illustrates an embodiment of RSD implementation at a proxy system 600. A proxy is a computer system used as a network server and normally used to connect between users' systems and the Internet. A proxy is commonly used by an entity, such as a corporation or university, to distribute network loading and to screen data being transferred, which is commonly known as firewalls. In FIG. 6, user 602 and user 603 are connected to a proxy 604, where the proxy 604 could be a personal computer ("PC"), a mini-computer, a main-frame computer, or a cluster of computer systems, which may include a combination of PC's, minicomputers, and main-frame computers. The Internet 606 connects to a main site 608, replicated site X 618, replicated site Y 628, and replicated site Z 638, where replicated sites X 618, Y 628, and Z 638 are mirrored sites of the main site 608. Mirrored sites contain the same information as the main site 608 and users can usually obtain information either from a mirrored site or from the main site 608.

In operation, the proxy 604 issues a DNS lookup and subsequently receives multiple IP server addresses including the main site 608, replicated sites X 618, Y 628, and Z 638. The proxy 604 uses DNS protocol because DNS protocol is capable of providing multiple IP site addresses. After all IP server addresses, which are the main site 608, replicated sites X 618, Y 628, and Z 638, are referenced at least once for the network transactions, the proxy 604 sorts the addresses into a preferred list of servers addresses. The address listed on the top of the sotted preferred list is the most preferred server address, which points to the most preferred server or the optimal site is addressed by the most preferred server address. Moreover, if the optimal server goes down, the proxy 604 selects the next most preferred site to be the new optimal site. Furthermore, switching between the old optimal site and a new optimal site occurs seamlessly to users.

Figure 7:
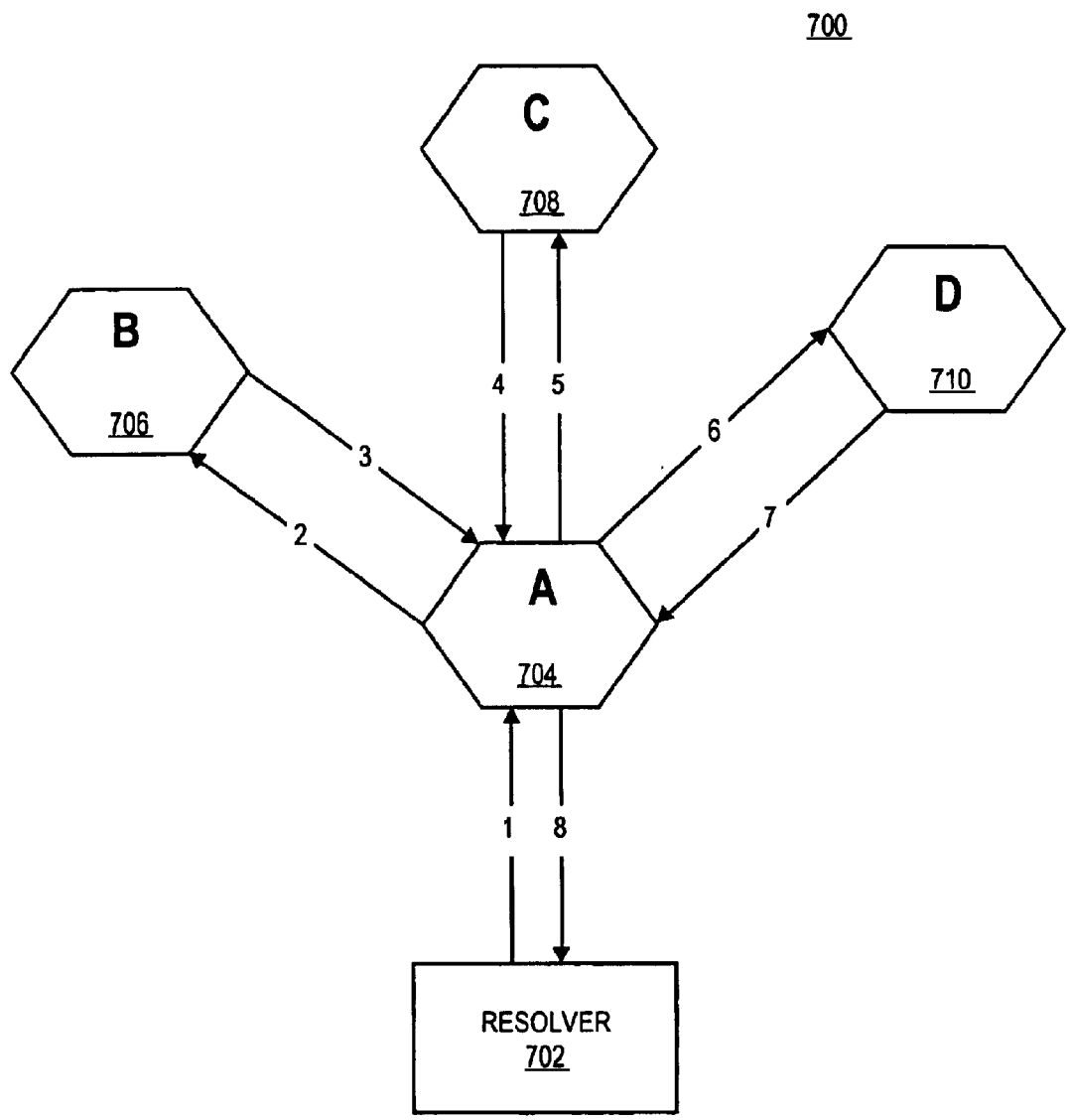
FIG. 7 illustrates a resolution process using name servers implementing RSD in accordance with an embodiment of the present invention.

FIG. 7 illustrates a mechanism of using name servers to implement RSD 700. A name server retains information about some segment of a database and a resolver makes the retained information in a name server available to network users. The mechanism 700 illustrates a resolver 702 that is connected to a name server A 704, where the name server A 704 also connects to name servers B 706, C 708, and D 710. The resolver 702 contains information about name servers and it is often just library routines that create queries and then send queries across the network. Each name server contains some information regarding Website addresses and a first name server refers to a second name server if the first name server does not have all requested information. FIG. 7 demonstrates one embodiment of a DNS query mechanism where the resolver 702 initiates a query to name server A 704. Name server A 704 queries name server B 706 when name server A 704 does not contain the information requested. When name server B 706 does not have the requested information, name server B 706 informs name server A 704 that name server C 708 may have the requested information. Name server A 704 subsequently queries name server C 708. When name server C 708 does not have the requested information, name server C708 informs name server A 704 that name server D 710 may have the requested information. After querying name server D 710, name server A 704 receives an answer for the requested information and subsequently passes the answer to the resolver 702. The name server A 704 is frequently referred to as a local name server. Name server D 710 is referred to as an authoritative name server.

In one embodiment, a local DNS name server is used to implement RSD. Referring to FIG. 7, name server A 704 would be the local name server and RSD can be implemented by name server A 704. Before name server A 704 makes further query to name server B 706, C 708, or D 710, RSD at name server A 704 checks its local cache to determine whether the cache contains the optimal server address. Upon finding the optimal server address, name server A 704 can answer the query without additional query. In another embodiment, the list of preferred servers, where the most preferred server is the optimal server, is discovered by implementing RSD Metrics.

In another embodiment, RSD can also be implemented by a browser because the browser receives multiple IP server addresses for each query. A network browser is a program that allows a user to access a network for sending, browsing, and receiving information over the network. The browser can be configured to evaluate each IP server address to establish a preferred list of servers. A browser can be configured to implement RSD Metrics to test server addresses at the same time with different metric tests, such as HTML ("HyperText Mark up Language"), images, audio/video etc. However, depending on applications, implementation of RSD by the browser can cause excessive network traffic due to too many browsers in use.

Figure 8:
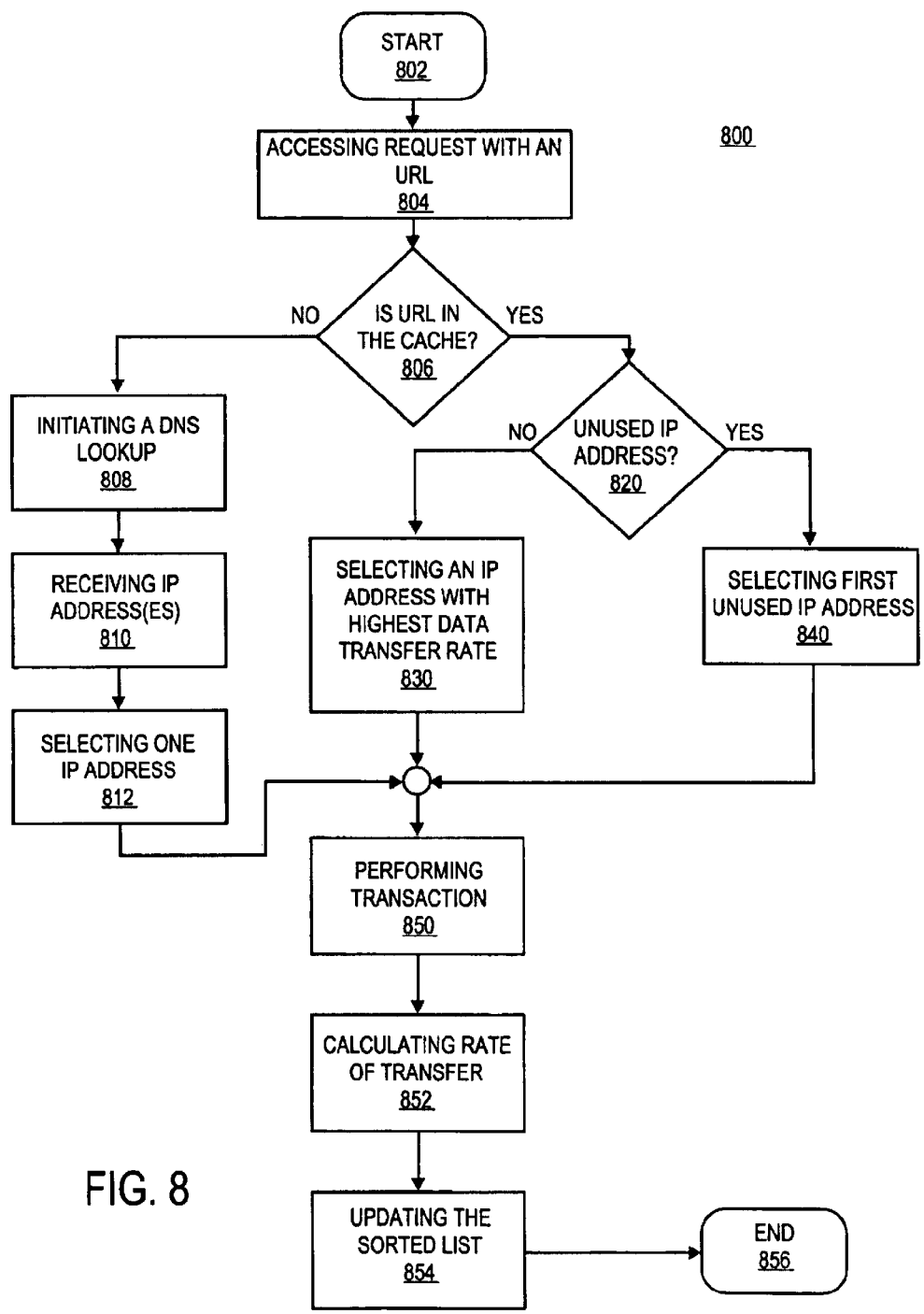
FIG. 8 illustrates a system flow diagram of RSD in accordance with the present invention.

FIG. 8 illustrates a system flow diagram of RSD 800. The process starts at block 802 and then proceeds to block 804 to examine whether a requested URL host name is properly received. Upon receiving the URL, the process proceeds to block 806 to check whether the URL is in the system cache memories. To improve network accessing, memories are often employed within servers to store recently accessed Website addresses. If the URL is not in the memory, the process proceeds from block 806 to block 808, where the process issues a DNS lookup.

Upon initiating a DNS lookup, all IP site addresses relating to the URL are searched and collected. At block 810, the process receives a list of IP site addresses in response to the DNS lookup. The process proceeds from block 810 to block 812, where the list of the IP site addresses is stored and an IP server address from the list is selected. The process then proceeds to the next block 850. If the URL is in the cache, the process proceeds from block 806 to block 820 where the process determines whether there is at least one unused IP address in the cache. An unused IP address refers to an IP site address that has not been referenced.

If there is at least one unused IP site address, the process moves from block 820 to block 840, where the process selects the next unused IP site address for the network transaction. On the other hand, if there are no unused IP site addresses, which indicates the optimal site is available, the process proceeds from block 820 to block 830, where an optimal site address from the cache is fetched. After an address has been chosen, the process proceeds to block 850, where the process performs a requested network transaction. In another embodiment, the process performs RSD Metrics to each IP server address for discovering the optimal site address.

At block 852, the process records responses from data transactions and types of data involved in the transactions. Data types may include text, video/audio, and image files. When the responses and data types are stored, the process calculates rate of transfer with respect to the data type. At block 854, the process sorts the addresses into a preferred list of site addresses according to the responses and data types. The site address appear on the top of the preferred list is the optimal site and the address appear next to the top of the preferred list is the second most preferred site and so on. The process updates the preferred list and proceeds to block 856 where the process is terminated.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for network communication comprising:
   receiving server addresses;
   requesting network transactions using said server addresses;
   receiving responses of said network transactions;
   recording responses of said network transactions using said server addresses;
   sorting said server addresses according to said responses and data types used in said network transactions lo establish a prioritized list of said server addresses for the future network transactions; and
   deleting said server addresses from said prioritized list if said server addresses are unavailable.

2. The method of claim 1, wherein receiving server addresses further includes identifying replicated server addresses.

3. The method of claim 1 further comprising using DNS lookup to obtain said server addresses.

4. The method of claim 1, wherein sorting further includes indicating an optimal server address from the prioritized list of said server addresses for the future transactions.

5. The method of claim 1 further comprising storing a sorted server addresses in a memory, wherein said sorted server addresses are used for identifying an optimal server.

6. The method of claim 1 further comprising retrieving said server addresses, wherein one of said server addresses is an optimal server.

7. The method of claim 1 further comprising updating status for said server addresses.

8. The method of claim 1 further comprising discovering said responses by performing replicated server discovery ("RSD") metrics.

9. The method of claim 8 wherein performing metrics include performing any one of Ping, Traceroute, Opening a connection to port 80 metrics, measure actual file transfer rate, and classify transfer rate by file type.

10. The method of claim 8 wherein performing metrics further includes performing a combination of any one of Ping, Traceroute, Opening a connection to port 80 metrics, measure actual file transfer rate, and classify transfer rate by file type.

11. An apparatus for network communication comprising:
    means for receiving server addresses;
    means for requesting network transactions using said server addresses;
    means for receiving responses of said network transactions;
    means for recording responses of said network transactions using said server addresses;
    means for sorting said server addresses according to said responses and data types used in said network transactions to establish a prioritized list of said server addresses for the future network transactions; and
    means for deleting said server addresses from said prioritized list if said server addresses are unavailable.

12. The apparatus of claim 11, wherein said receiving server addresses further includes means for identifying replicated server addresses.

13. The apparatus of claim 11 further includes means for using DNS lookup to obtain said server addresses.

14. The apparatus of claim 11, wherein said sorting further comprising means for indicating an optimal server address from the prioritized list of said server addresses for the future transactions.

15. The apparatus of claim 11 further comprising means for storing a sorted server addresses in a memory, wherein said sorted server addresses is used for identifying an optimal server.

16. The apparatus of claim 11 further comprising means for retrieving said server addresses, wherein one of said server addresses is an optimal server.

17. The apparatus of claim 11 further comprising means for updating status of said server addresses.

18. The apparatus of claim 11 further comprising means for identifying said responses by performing replicated server discovery ("RSD") metrics.

19. A system comprising:
    a processor; and
    a replicated server discovery ("RSD") coupled to said processor, said RSD configured to select an optimal server by retrieving a server address from a prioritized list of server addresses, wherein said server addresses include replicated server addresses, and said RSD configured to delete said server address from the prioritized list if said server address is unavailable.

20. The system of claim 19 further comprising a database for storing said server addresses.

21. The system of claim 19, wherein said RSD is further configured to sort said prioritized list in response to server response times.

22. The system of claim 19, wherein said RSD is further configured to use DNS lookup to obtain said server addresses.

23. The system of claim 19, wherein said RSD is further configured to update said prioritized list.

24. The system of claim 19, wherein said RSD is further configured to record responses from servers addressed by said server addresses.

25. The system of claim 19, wherein said RSD is further configured to use RSD metrics to obtain responses from servers addressed by said server addresses.

26. The system of claim 25, wherein said RSD metrics include any one of Ping, Traceroute, Opening a connection to port 80, measure actual file transfer rate, and classify transfer rate by file type.

27. The system of claim 25, wherein said RSD metrics include a combination of any one of Ping, Traceroute, Opening a connection to port 80, measure actual file transfer rate, and classify transfer rate by file type.

28. An article of manufacture for use in a computer system for improving data transfer in communication networks, the article of manufacture comprising a computer usable medium having computer readable program code means embodied in the medium, the program code comprising:

code for receiving server addresses;

code for recording responses of network transactions using said server addresses;

code for sorting said server addresses according to said responses and data types used in said network transactions to establish a prioritized list of said server addresses for the future network transactions; and code for deleting said server addresses from said prioritized list when said server addresses are unavailable.

29. The article of manufacture of claim 28, wherein said receiving server addresses further comprising means embodied in the computer usable medium for causing a computer to discover replicated server addresses.

30. The article of manufacture of claim 28 further comprising means embodied in the computer usable medium for causing a computer to use DNS lookup to obtain said server addresses.

31. The article of manufacture of claim 28 further comprising means embodied in the computer usable medium for causing a computer to retrieve an optimal server address.

32. The article of manufacture of claim 28 further comprising means embodied in the computer usable medium for causing a computer to perform RSD metrics to obtain responses from servers addressed by said server addresses.

33. The article of manufacture of claim 28 further comprising means embodied in the computer usable medium for causing a computer to sort said server addresses in response to said responses.

34. The article of manufacture of claim 28 further comprising means embodied in the computer usable medium for causing a computer to prioritize said server addresses according to said responses.

* * * * *